Aug. 14, 1951 W. A. WILDHACK 2,564,416
MECHANOELECTRIC TRANSDUCER
Filed March 14, 1949 2 Sheets-Sheet 1

INVENTOR
WILLIAM A. WILDHACK,
BY *D. B. Angler*
ATTORNEY

Aug. 14, 1951 W. A. WILDHACK 2,564,416
MECHANOELECTRIC TRANSDUCER
Filed March 14, 1949 2 Sheets-Sheet 2

INVENTOR
WILLIAM A. WILDHACK,
BY
ATTORNEY

Patented Aug. 14, 1951

2,564,416

UNITED STATES PATENT OFFICE 2,564,416

MECHANOELECTRIC TRANSDUCER

William A. Wildhack, Arlington, Va.

Application March 14, 1949, Serial No. 81,379

9 Claims. (Cl. 73—432)

(Granted under the act of March 3, 1883, as amended April 30, 1928; 370 O. G. 757)

This invention relates to devices for translating relatively small mechanical displacements into electrical effects of relatively greater magnitude.

Such devices are particularly well suited for use in strain gages, pressure gages, accelerometers, scales, temperature responsive apparatus, inverters, regulators, microphones, phonograph pick-ups, and many other applications.

In accordance with the present invention, a translating device comprises a resilient electrical conductive spiral filament having adjacent convolutions providing mutual contact areas, the stiffness of the filament varying along its length in such a manner that certain of the convolutions will yield under smaller deformation forces than are required to displace others of the convolutions.

It is preferable that adjacent convolutions of the filament be in mutual contact at no load and/or that the filament be coated at least partially with a material having a lower resistivity than that characterizing the filament itself.

With its adjacent convolutions in mutual contact at no load, the application of extending forces to the filament will cause certain of the convolutions to separate before others. In any case, the filament may be helically formed and its stiffness may vary uniformly progressively along its active length. The coating material may be perimetrically discontinuous on the filament and preferably resists oxidation sufficiently to retain its conductivity substantially unimpaired.

The deforming force may be applied by a condition responsive element, sensitive to various effects such as temperature, pressure, humidity, vibration, gravity, light, sound, magnetism, electrical charge, volumetric change, and others. And it is important to observe that the relationship of electrical resistance of the spiral to the deforming force, can be rendered substantially linear by winding the spiral so that its stiffness is a linear function of distance measured along the length of the filament itself. And it should be understood that the term stiffness as employed throughout this specification refers to the property which determines the force necessary to effect a change between contact and separation of adjacent convolutions of the device.

Circuit conductors electrically connected with spaced portions of the filament, will cause mechanical displacements to be reflected in their circuit as electrical changes in resistance, current and/or voltage.

Inasmuch as the percentage change in the resistance of the mechano-electrical translating device can be many times greater than the percentage change in its length, very small displacements can be sensed and even measured without requiring other amplification. Thus it will follow that the device is itself applicable for use as an amplifier. It is contemplated, however, that conventional amplifiers be utilized with the translating device for further amplification wherever desirable.

A more complete understanding of the invention will follow from a description of the accompanying drawings wherein.

Figure 5:
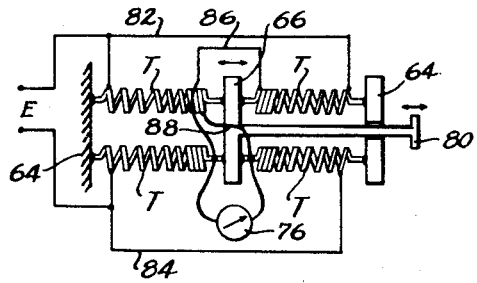
Figure 6:
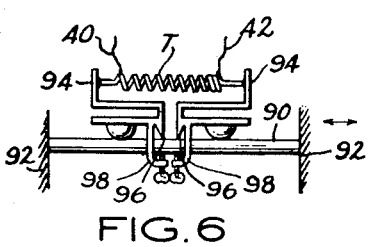
Figure 7:
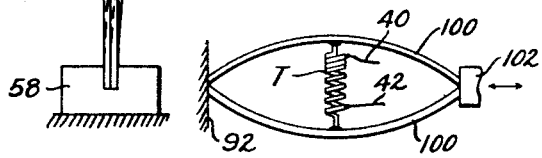
Figure 8:
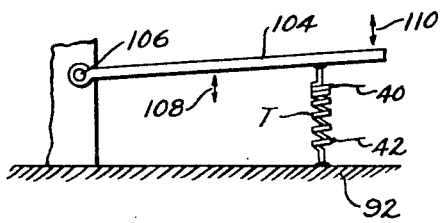
Figure 9:
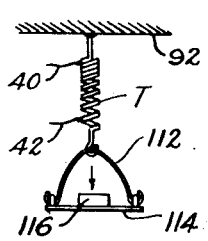
Figure 10:
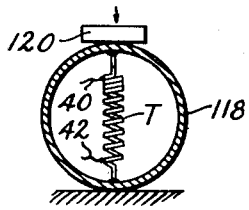
Figure 11:
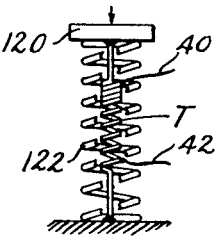
Figure 12:
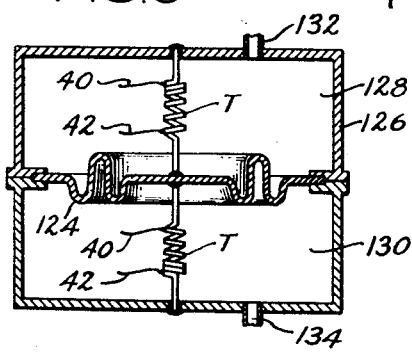
Figure 13:
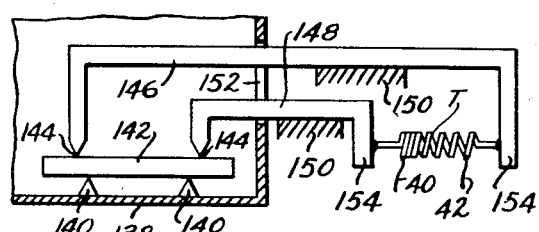
Figure 14:
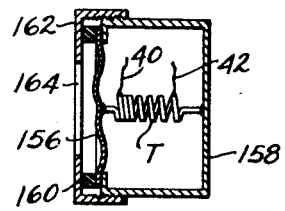
Figure 15:
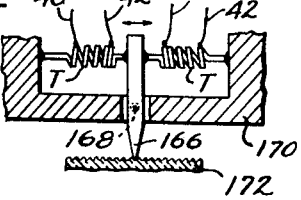
Figure 16:
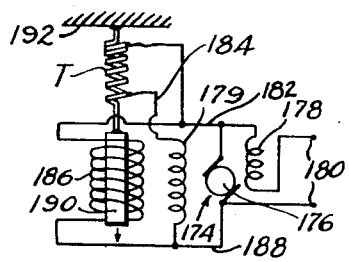
Figure 17:
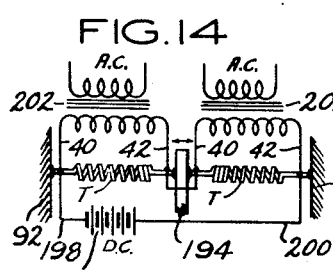
Figure 20:
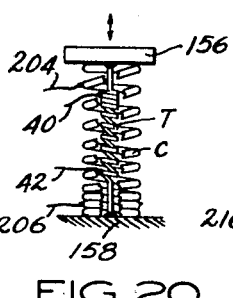
Figure 19:
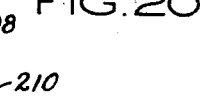
Figure 18:
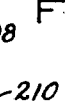

Fig. 5 diagrammatically depicts a four-arm bridge application;

Fig. 6 diagrammatically depicts a strain gage application;

Figs. 7 and 8 diagrammatically depict the use of force dividers and multipliers in applying the invention;

Figs. 9, 10 and 11 diagrammatically depict arrangements for use in force measuring;

Fig. 12 is a sectional elevation of a pressure gage embodying the invention;

Fig. 13 is a somewhat diagrammatic elevation, partially in section, illustrating the sensing of elevated temperature effects;

Fig. 14 is a sectional elevation illustrating a microphone application of the invention;

Fig. 15 is a fragmentary sectional elevation depicting a phonograph pick-up cooperating with a grooved record;

Fig. 16 diagrammatically depicts a voltage regulator application;

Fig. 17 is a diagrammatic showing of the invention applied to an inverter;

Fig. 18 is a sectional elevation, partially diagrammatic, of an inverter having its components submerged in a liquid; and Figs. 19 and 20 illustrate combinations of tension and compression types of translating devices embodying the invention.

Figure 1:
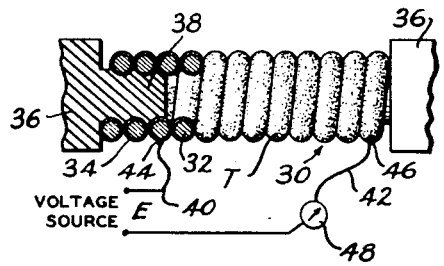
Fig. 1 is a fragmentary elevation, partially in section and partially schematic, depicting a translating device with its adjacent convolutions in mutual contact.
Figure 2:
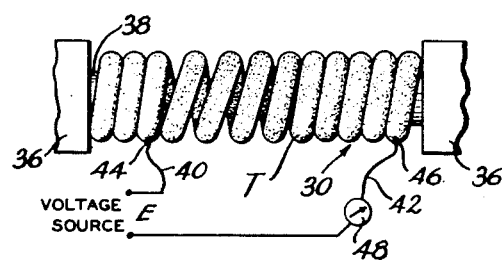
Fig. 2 is an elevation of the device of Fig. 1 with certain convolutions in spaced relationship.

The translating device 30 shown in Figs. 1 and 2 assumes the form of a spiral or helical tension spring, generally designated by the letter T throughout the drawings. The spring is wound from a resilient filament 32 characterized by a relatively high electrical resistivity and substantial stability under varying temperature conditions. Among other materials, and by way of example, nickel alloy wire has been employed satisfactorily in forming a filament having these characteristics. A very thin coating 34 of silver, gold, platinum, or other relatively good conductor, may be applied to the filament to reduce contact resistance between the convolutions of the spiral or helical spring. Such a coating must be thin enough to be of such high resistance that the shunt path so defined will not substantially modify the intended performance of the filament itself. The conductivity of this coating will be relatively unimpaired by oxidation, thus preserving low contact resistance between the convolutions. A gold coating of 0.0001 inch thickness has proved to be satisfactory in several applications of the device, and will serve to illustrate a practical example.

The tension of the spring T shown in Figs. 1 and 2 is progressively uniformly varied throughout its length, so that when the spring carrying abutments 36 are separated, the convolutions separate progressively. An intermediate position of the spring is depicted in Fig. 2 wherein its tension increases from left to right. When the spring is subjected to no load, as depicted in Fig. 1, the convolutions are in mutual contact, and the resistance between any two axially displaced points is the resistance of the cylinder defined by the spring between those points. As extending forces are applied, the resistance increases, until, with all of the convolutions separated, the resistance between the points is that of the included portion of the filament itself. Since the percentage change of resistance may be hundreds of times greater than the percentage change in length of the spring, displacements of the order of 0.00001 inch can be sensed and measured with facility without necessitating additional amplification.

The abutments 36 of Figs. 1 and 2 are provided with reduced threaded ends 38 upon which the ends of the helices 30 are secured for operation. Suitable leads 40 and 42 are secured in electrically conducting relationship to spaced points 44 and 46 respectively of the spring, in circuit with a voltage source E and an indicating or recording instrument 48. In many of the applications contemplated, the translating device T will be subjected to sufficient initial tension to separate some, but not all of its convolutions, with the result that displacements in either direction parallel to the spring axis will result in an indication by the instrument 48 or in an actuation of other instrumentalities in the circuit.

The varying tension may be imparted to the helix by varying the angle at which the filament is fed to a rotating mandrel; by varying the tension on the filament as it is wound; by varying the diameter of the filament; by varying the diameter of the helix; by varying the twist of the filament as it is fed to a rotating mandrel; or in any other manner that will produce the desired results.

Figure 3:
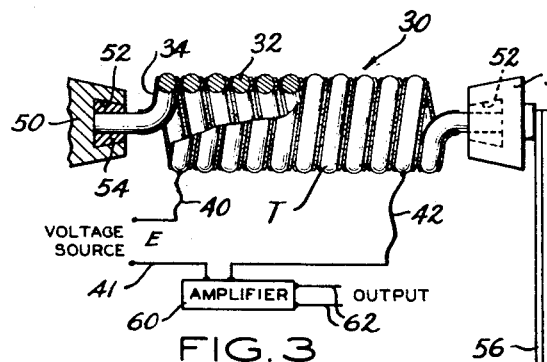
Fig. 3 is a fragmentary elevation, partially in section and partially schematic, depicting a translating device in circuit with an amplifier and subject to the deforming forces imposed by a bimetallic thermal element.

The translating device 30 depicted in Fig. 3 is also formed by helically winding a filament 32 in the form of a tension spring T whose stiffness varies progressively uniformly throughout its length. In this case the thin coating 34 of high resistance and low resistivity, is restricted to the contacting zones of the convolutions so as to be perimetrically discontinuous. The mounting of the spring is different from that of the preceding figures, the abutments 50 containing outwardly converging bores 52 in which the ends of the helix are anchored by means of solder 54 or the like. The deforming forces are applied in this case by a thermo-sensitive bimetallic element 56 whose upper end is secured to one of the abutments 50 and whose lower end is fixed in a support 58. When temperature changes cause the bimetallic element to move towards the broken line position shown, the convolutions of the helix begin to open from one end towards the other, increasing the resistance imposed in the circuit formed by the voltage source E, lead 40, the filament 32, lead 42, the amplifier 60, and the return lead 41. The output leads 62 of the amplifier may be connected to any instrument or system desired for producing an indication, a record, or a control.

Figure 4:
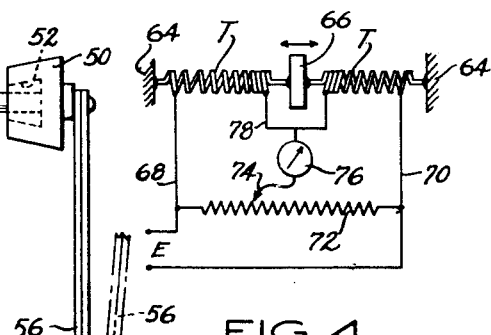
Fig. 4 is a diagrammatic view of a two-arm bridge embodying the invention.

The two-arm bridge diagrammatically shown in Fig. 4 employs two tension helices T, whose remote ends are suitably secured to walls 64 and whose proximate ends are connected to an actuator 66 which transmits the deformation forces to the spiral springs parallel to their axes. A suitable source applies a voltage E to the remote ends of the springs by means of leads 68 and 70. The ends of a potentiometer resistor 72 are also connected to the leads 68 and 70, a variable tap 74 connecting intermediate portions of the resistor, through a galvanometer 76, to a lead 78 common to the proximate ends of the springs. It will follow that movement of the actuator 66 will effect displacement of the tension springs T, tending to close one and tending to open the other, thereby unbalancing the bridge and producing a deflection of the galvanometer needle. By suitably calibrating the instrument the deforming effect can be read directly in appropriate units.

The bridge depicted in Fig. 5 contains one of the spirals or helices T in each of its four arms. Spaced walls or supports 64 provide anchors for the remote ends of the helices, their proximate ends being secured to an actuator 66, movable in directions parallel to the axes of the helices in response to forces imposed upon its extension 80, shown as projecting beyond one of the walls 64. The helices are connected with a source of voltage E and a galvanometer 76 in the manner of the well known Wheatstone bridge. The remote ends of the upper helices are connected to the voltage source by a lead 82, the remote ends of the lower helices being connected to the other terminal of the voltage source by a lead 84. The proximate ends of the helices are cross-connected by leads 86 and 88, the former connecting the upper right helix with the lower left, the latter connecting the upper left helix with the lower right. The galvanometer is connected across the leads 86 and 88 to complete the bridge, which has been illustrated in this case as a Wheatstone bridge. Movement of the actuator 66 to the right increases the resistance of the left hand helices and decreases that of the right hand helices, resulting in a change of the galvanometer reading. Movement of the actuator to the left produces opposite changes in resistance and an opposite indication by the galvanometer.

Fig. 6 depicts a strain gage for a specimen 90 secured to relatively movable members 92 which impart the stresses whose effects are to be measured. A pair of brackets 94 are provided with knife edges 96 for engagement with the specimen, to which they are fastened by suitable clamps 98. The tension helix or spiral T is secured to upstanding arms provided by the brackets so that any change in length of the specimen 90 will effect a change in the spacing of the brackets and thereby displace the convolutions of the member T. This displacement will modify the resistance of the helix which will in turn modify a circuit containing the leads 40 and 42 which are electrically connected at spaced points to the helix.

Fig. 7 illustrates the use of a mechanical divider in the form of a pair of bowed leaves 100, one end of each being fixed to a wall or support 92, and the other end of each being fastened to an actuator 102 which is relatively movable with respect to the wall 92 in the directions of the arrows. A helical tension translating device T has its ends secured to the bowed members respectively so as to receive the vertical components of movement transmitted to these members. The effects of such movements will be transmitted electrically to a circuit containing the spiral member T, connected through its leads 40 and 42.

Fig. 8 depicts another application of the invention with a force multiplying or force reducing mechanism. In this case, the tension spiral T, provided with leads 40 and 42, has one of its ends secured to a fixed support 92, and its other end secured to a lever 104, which is mounted by a pivot 106 to a suitable fixed support. Displacing forces can be applied at any point along the lever, exemplified by the arrows 108 and 110, so that the displacing movement can be either increased or reduced at the point at which the spring is fastened.

Fig. 9 illustrates the manner in which the invention can be applied to direct weighing. In this case, the upper end of the tension spiral T is suspended from a support 92, its lower end receiving a bail 112 which supports a pan 114 for supporting a specimen 116 to be weighed. Extension of the translating device T under the effects of the force of gravity upon the specimen, will modify the circuit to which the spiral device is connected by its leads 40 and 42.

In Fig. 10 the invention has been depicted in association with a proving ring 118 to which a displacing force is applied by or through an actuator 120. In this manner, mechanical displacement of the translating device T will be reduced, yet still in proportion to the applied forces. As in previous examples, the translating device will be connected in an appropriate electrical circuit through its leads 40 and 42.

Fig. 11 depicts a variation of the mechanism shown in Fig. 10 wherein a helical compression spring 122 assumes the load applied by or through an actuator 120 to reduce the mechanical displacement of the tension helix T whose leads 40 and 42 connect it in a suitable electric circuit.

The invention can be applied to the measurement of pressure in various ways, an example of which appears in Fig. 12 wherein a diaphragm 124 divides a housing 126 into two compartments 128 and 130. These compartments are provided with fluid ports 132 and 134 respectively, which may be exposed to various media whose pressures are to be measured or compared. Differences in pressure in the two chambers will effect displacement of the diaphragm 124, to opposite surfaces of which, tension helices T of the type herein contemplated are secured. The remote ends of these translating helices are secured to the walls of the casing 126. The leads 40 and 42 connected to these helices may be connected in an electrical circuit or circuits for producing indications or controlling devices of various types.

Fig. 13 diagrammatically illustrates the manner in which the invention can be applied where high temperatures are to be sensed, or other effects are to be sensed in the presence of high temperatures. An oven or furnace 138 is provided with supports 140 for a specimen 142, spaced portions of which are engaged by the knife edges 144 of rods 146 and 148, which may be of quartz or other material suitable to exposure to high temperatures, which rods are provided with suitable bearings or supports 150 for maintaining them in alignment. These rods penetrate an opening 152 provided in the furnace wall, and their depending arms 154 are secured to the opposite ends of a tension translating device T whose leads 40 and 42 are connected in a suitable circuit. In this case, expansion or contraction of the specimen 142 will result in a change in the resistance of the device T, the effect of which on its circuit can produce indications or controlling effects in various ways known in the art.

An application of the invention to microphones or telephones is diagrammatically illustrated in Fig. 14 wherein a diaphragm 156 is clamped across the mouth of a casing 158 by means of a gasket 160, which is clamped by a cover 162 threaded on the casing, the cover containing an opening 164 for the passage of sound waves. A tension translating helix T has one of its ends secured to the diaphragm, and the other to the casing. Displacement of the diaphragm by sound waves will cause the convolutions of the spring T to vary their mutual contacts and thus modify the resistance of the circuit in which its leads 40 and 42 are connected. In this case, the leads may be connected directly to a receiver, or through a supplemental amplifier if desired. The diaphragm may be stiff or yieldable, depending upon the type of response desired. Where a yieldable diaphragm is used it may be desirable to employ an arrangement such as that depicted in Fig. 20, to be described, which will make it possible to obtain straight line characteristics.

Fig. 15 illustrates the application of the translating device of the present invention to a phonograph pickup wherein a stylus 166 is mounted by means of a suitably located pivot 168 for movement with respect to its casing 170 resulting from the characteristics of the grooves formed in the record 172. A pair of spiral translation devices T have their proximate ends secured to opposite surfaces of the stylus, and their remote ends suitably secured to walls of the housing 170. Movements of the stylus will result in displacement of the spirals, changing their effective resistance and that of their circuit or circuits to which their leads 40 and 42 are connected.

Fig. 16 illustrates a voltage regulator for a dynamo electric machine 174 having an armature 176, a series field 178, a shunt field 179, and terminals 180. A pair of leads 182 and 188 connects the armature in parallel with a circuit containing a translating device T connected in series with the shunt field 179 by a lead 184. The lead 182 is also connected with the winding 186 of an electromagnet, the other side of the winding being connected to the other terminal of the armature by means of a lead 188. The armature 190 of the electromagnet is mechanically connected with one end of the spiral spring T, whose other end is secured to a fixed support 192. From this circuit it will follow that when there is an increase in voltage across the armature of the machine, the armature of the electromagnet will be moved in such a direction as to increase the resistance of the translating device T, tending to restore the voltage to a preselected value desired.

Fig. 17 depicts the invention as applied to an inverter wherein an actuator 194 forming a part of the so-called vibrator customarily used in such devices, varies the displacement of the two tension helices T secured to its opposite surfaces, the remote ends of these helices being secured to casing walls 92. A source 196 of direct current is connected by leads 198 and 200 to the remote ends respectively of the spiral members so that when the actuator 194 is oscillated or reciprocated in the general direction of the arrows, the spiral members will be lengthened and shortened to produce undulating voltages across the leads 40 and 42. These leads may be connected with the primary of a transformer 202 whose secondary will supply an alternating output of desired voltage. This application of the invention will serve to illustrate the more general application wherein electromagnet effects (movement of the vibrator 194) are converted into mechanical displacements which are in turn translated into electrical changes.

The application of the invention depicted in Fig. 18 contemplates a system similar to that described with respect to Fig. 17, but in this case, there are four tension helices T operating in a surrounding body of liquid 208 received by a suitable container 210. A lead 198 connected with a suitable source of direct current is connected to the remote portions of an upper pair of tension helices T, and a lead 200 from the other side of the source is connected to the remote ends of a lower pair of tension helices T. The proximate ends of these four helices are secured to an actuator 194, which may be the arm of a vibrator, the remote ends of these helices being secured to the walls of the container 210. The proximate ends of the upper left and lower right helices are interconnected by a lead 212 to one side of an alternating current output. Similarly, the proximate ends of the lower left and upper right helices are interconnected by a lead 214 with the other side of an alternating current output. Oscillation or reciprocation of the actuator 194 will increase and diminish the effects of the tension helices T in such order as to produce an alternating output which may be used directly or through a transformer or other component for modification of the current characteristics. Submersion of the helices in the liquid will produce damping or cooling effects which will be desirable in some applications.

Fig. 19 depicts the use of a pair of tension helices T in combination with a pair of compression helices C. The compression helices are constructed so that their adjacent convolutions will close substantially uniformly progressively as the helices are compressed in much the manner that the tension helices have their convolutions separated upon extension. One end of each of the four helices is secured to a wall 216, their other ends being secured to an actuator 218 through which mechanical displacements are transmitted to the helices. As the resistance of the tension helices is increased, the effective resistance of the compression helices will likewise be increased, the effects of which will be utilized electrically by connecting the leads 40 and 42 of the tension helices and the leads 204 and 206 of the compression helices, in suitable circuits. It will be noted that by properly designing the tension and compression of the various helices, a balanced effect can be produced, or any degree of unbalance may be achieved.

Fig. 20 illustrates the use of a tension helix T of the type hereinbefore described with a surrounding compression helix C, differing from the tension helix T in that its convolutions are customarily separated and uniformly progressively brought into contact as the helix is compressed. The tension helix T is provided with its usual leads 40 and 42, the compression helix C being provided with terminals 204 and 206. One end of each of these helices is suitably secured to the wall of a casing 158, which may be the same casing as described in the microphone application depicted in Fig. 14. The opposite end of each of these helices is suitably secured to a displaceable member, which may be the diaphragm 156 of Fig. 14. In this case, the diaphragm may be highly flexible yet the electrical output can be made to be linear with respect to the displacing forces whether they be sound waves or assume some other form.

The stiffness with which the present specification and claims are concerned, is the property which determines the force necessary to effect a change from a condition of contact to a condition of separation, or from a condition of separation to a condition of contact, of adjacent convolutions.

Although many applications of the present invention have been depicted and described by way of example, it will be recognized by those skilled in the art just as it has been recognized by the present inventor, that many more applications suggest themselves from this disclosure, and accordingly, the invention should not be restricted to the various constructions illustrated beyond the scope of the appended claims.

The invention described herein may be manufactured and used by or for the Government of the United States for governmental purposes without the payment of any royalties thereon or therefor.

I claim:

1. A mechano-electrical translating device comprising a resilient electrically conductive spiral filament having adjacent convolutions in mutual contact at no load, said filament being of relatively high electrical resistance, and having an electrically conductive coating having a lower contact resistivity than said filament, said coating being disposed to provide the said mutual contact between said convolutions, and said coating being of small thickness providing high resistance in shunt with said filament to not substantially modify the resistance of the filament itself, the stiffness of said filament varying along its length whereby certain of said convolutions will separate from said condition of mutual contact under smaller extending forces than required to separate others of said convolutions.

2. A mechano-electrical translating device comprising a resilient electrically conductive spiral filament having adjacent convolutions with mutual contact areas, the stiffness of said filament varying along its length whereby certain of said convolutions are yieldable under smaller deformation forces than required to displace others of said convolutions, and an electrically conductive coating on said filament of a material having a lower resistivity than said filament and providing reduced contact resistance between the convolutions, said coating being very thin providing high resistance in its shunt path along said filament.

3. A mechano-electrical translating device comprising a resilient electrically conductive spiral filament having adjacent convolutions with mutual contact areas, the stiffness of said filament varying along its length whereby certain of said convolutions are yieldable under smaller deformation forces than required to displace others of said convolutions, and an electrically conductive coating on said mutual contact areas of said filament, said coating being perimetrically discontinuous with respect to said filament and having a lower resistivity than said filament.

4. A mechano-electrical translating device comprising a resilient spiral electric conductor having adjacent convolutions with mutual contact areas, the stiffness of said spiral conductor varying along its length whereby certain of said convolutions are yieldable under smaller deformation forces than required to displace others of said convolutions, and a perimetrically discontinuous electrically conductive coating on said conductor, said coating having a lower resistivity than said filament.

5. A mechano-electrical translating device comprising a resilient electrically conductive spiral filament having adjacent convolutions with mutual contact areas, the stiffness of said filament varying along its length whereby certain of said convolutions are yieldable under smaller deformation forces than required to displace others of said convolutions, an electrically conductive coating on said filament of a material having a lower resistivity than said filament, and providing reduced contact resistance between the convolutions, said coating being of small thickness providing high resistance in its shunt path along said filament to not substantially modify the resistance of the filament itself, and circuit conductors electrically connected with spaced portions of said filament.

6. A mechano-electrical translating device comprising a resilient electrically conductive spiral filament having adjacent convolutions with mutual contact areas, the stiffness of said filament varying along its length whereby certain of said convolutions are yieldable under smaller deformation forces than required to displace others of said convolutions, an electrically conductive coating on said filament of a material having a lower resistivity than said filament, and providing reduced contact resistance between the convolutions, said coating being of small thickness providing high resistance in shunt with said filament to not substantially modify the resistance of the filament itself, the said varying stiffness of said filament being a linear function of distance measured along the length of the filament whereby the relationship of electrical resistance of the filament to the deformation force is substantially linear.

7. A mechano-electrical translating device comprising a resilient electrically conductive spiral filament having adjacent convolutions with mutual contact areas, the stiffness of said filament varying along its length whereby certain of said convolutions are yieldable under smaller deformation forces than required to displace others of said convolutions, an electrically conductive coating on said filament of a material having a lower resistivity than said filament, and providing reduced contact resistance between the convolutions, said coating being of small thickness providing high resistance in shunt with said filament to not substantially modify the resistance of the filament itself, and a condition responsive element coupled to said filament for applying said deformation force to said filament.

8. A mechano-electrical translating device comprising a resilient electrically conductive spiral filament having adjacent convolutions with mutual contact areas, the stiffness of said filament varying along its length whereby certain of said convolutions are yieldable under smaller deformation forces than required to displace others of said convolutions, an electrically conductive coating on said filament of a material having a lower resistivity than said filament, and providing reduced contact resistance between the convolutions, said coating being of small thickness providing high resistance in shunt with said filament to not substantially modify the resistance of the filament itself, a condition responsive element coupled to said filament for applying said deformation force to said filament, circuit conductors electrically connected with spaced portions of said spiral filament, an electrical circuit, and indicating or recording means.

9. A variable resistance device comprising an electrically conductive helically wound spring having a substantially uniform diameter throughout its length and possessing a progressively varying stiffness along its length, adjacent convolutions of said spring mutually contacting in the absence of external tension, said convolutions being of such varying stiffness that the ratio of the change in the number of turns separated under external tension is proportional to the change in such tension.

WILLIAM A. WILDHACK.

REFERENCES CITED

The following references are of record in the file of this patent:

UNITED STATES PATENTS

| Number | Name | Date |
|---|---|---|
| 736,297 | Reed | Aug. 11, 1903 |
| 1,925,856 | Vaughan | Sept. 5, 1933 |
| 2,023,603 | Lodge | Dec. 10, 1935 |